United States Patent
Schlosser et al.

[11] Patent Number: 5,934,184
[45] Date of Patent: Aug. 10, 1999

[54] PORTABLE GAS GRILL

[75] Inventors: Erich J. Schlosser, Barrington; J. Michael Alden, Palatine; Robert T. Stephen, Barrington; James C. Stephen, Arlington Heights, all of Ill.

[73] Assignee: Weber-Stephen Products Co., Palatine, Ill.

[21] Appl. No.: 09/087,218

[22] Filed: May 29, 1998

Related U.S. Application Data

[63] Continuation of application No. 08/437,137, May 5, 1995, Pat. No. 5,765,469.

[51] Int. Cl.⁶ ....................................................... A47J 37/08
[52] U.S. Cl. ............................ 99/385; 99/400; 126/41 R; 126/25 R
[58] Field of Search ............................... 99/385, 393, 400, 99/446; 126/41 R, 25 R

[56]         References Cited

U.S. PATENT DOCUMENTS

| | | |
|---|---|---|
| D. 145,897 | 11/1946 | Hathaway . |
| D. 183,621 | 9/1958 | Levin . |
| D. 293,067 | 12/1987 | Stephen et al. . |
| D. 316,355 | 4/1991 | Stephen et al. . |
| 1,133,850 | 3/1915 | Garraux . |
| 1,224,157 | 5/1917 | Fry . |
| 1,954,476 | 4/1934 | Gloeckler . |
| 1,964,805 | 7/1934 | Barnes . |
| 2,097,793 | 11/1937 | Howell . |
| 2,173,166 | 9/1939 | Hoelscher . |
| 2,304,140 | 12/1942 | Bergholm ............................ 126/41 R |
| 2,484,239 | 10/1949 | Moon et al. . |
| 2,541,528 | 2/1951 | McAvoy . |
| 2,600,234 | 6/1952 | Foley . |
| 2,780,474 | 2/1957 | Farah et al. . |
| 2,817,331 | 12/1957 | Kaplan et al. . |
| 2,842,044 | 7/1958 | Kirk . |
| 2,888,544 | 5/1959 | Kesling . |
| 2,907,316 | 10/1959 | Windust . |
| 2,923,229 | 2/1960 | Halford . |
| 2,946,275 | 7/1960 | Compton . |
| 3,033,191 | 5/1962 | Bonadiman . |
| 3,081,692 | 3/1963 | Sorensen . |
| 3,124,057 | 3/1964 | Kiser . |
| 3,172,402 | 3/1965 | Valiela . |
| 3,353,527 | 11/1967 | Anderson . |
| 3,369,481 | 2/1968 | Pappas . |
| 3,391,682 | 7/1968 | King et al. . |

(List continued on next page.)

FOREIGN PATENT DOCUMENTS

| | | |
|---|---|---|
| 46671 | 12/1964 | Australia . |
| A-85.609/82 | 7/1982 | Australia . |
| S-94063 | 11/1986 | Australia . |
| A-34964/89 | 12/1989 | Australia . |
| 0 590 788 A1 | 6/1994 | European Pat. Off. . |
| A 2.132.681 | 11/1972 | France . |
| 2582086 | 11/1986 | France . |
| U 88 13 690 | of 1988 | Germany . |
| 143701 | 11/1919 | United Kingdom . |
| 967375 | 8/1964 | United Kingdom . |
| WO 87/00410 | 1/1987 | WIPO . |

OTHER PUBLICATIONS

Big Boy Deluxe—Adding Zest to Gracious Living, Model Nos. DL 300G and DL 85G.

Sweet's General Building and Renovation Catalog, 1994, Section 1140, "Food Service Equipment," Vulcun Company, Model VB22S, p. 7.

*Primary Examiner*—Reginald L. Alexander
*Attorney, Agent, or Firm*—Wallenstein & Wagner, Ltd.

[57]              ABSTRACT

The present invention relates to a portable gas grill (10) supported on a cart (20) with sliding covers (210), pivoting cooking guards (31), a fire box (100) of both cast sides (120) and sheet metal ends (140) hung on the cart (20), with an internal support structure (160) supporting a plurality of sear bars (410) and a cooking grid (101), a plurality of burners (510), a grease collector (62) and a tank support means (910) with a scale (913,914,915) for a fuel tank (900).

20 Claims, 11 Drawing Sheets

U.S. PATENT DOCUMENTS

| | | |
|---|---|---|
| 3,418,921 | 12/1968 | Fautz . |
| 3,443,510 | 5/1969 | Norton . |
| 3,552,301 | 1/1971 | McNeff . |
| 3,586,518 | 6/1971 | Folmar . |
| 3,683,791 | 8/1972 | Rast, Jr. . |
| 3,989,028 | 11/1976 | Berger . |
| 4,089,258 | 5/1978 | Berger . |
| 4,126,087 | 11/1978 | McLamb . |
| 4,233,890 | 11/1980 | Jansen . |
| 4,245,505 | 1/1981 | Baynes . |
| 4,350,140 | 9/1982 | Hamilton, Jr. . |
| 4,362,093 | 12/1982 | Griscom . |
| 4,382,432 | 5/1983 | Liadas . |
| 4,390,002 | 6/1983 | Daily, III . |
| 4,574,770 | 3/1986 | Wells . |
| 4,593,676 | 6/1986 | Wackerman . |
| 4,627,410 | 12/1986 | Jung . |
| 4,677,964 | 7/1987 | Lohmeyer et al. ................... 126/41 R |
| 4,683,867 | 8/1987 | Beatty . |
| 4,686,958 | 8/1987 | Skelton et al. . |
| 4,696,282 | 9/1987 | Incitti . |
| 4,706,643 | 11/1987 | Tyson ................................ 126/41 R X |
| 4,727,853 | 3/1988 | Stephen et al. . |
| 4,757,755 | 7/1988 | Sarten . |
| 4,809,671 | 3/1989 | Vallejo, Jr. . |
| 4,829,975 | 5/1989 | Hait . |
| 4,886,045 | 12/1989 | Ducate, Jr. et al. . |
| 4,896,650 | 1/1990 | Hait . |
| 5,070,776 | 12/1991 | Schlosser et al. . |
| 5,076,252 | 12/1991 | Schlosser et al. . |
| 5,154,158 | 10/1992 | Lindsey . |
| 5,293,859 | 3/1994 | Lisker . |
| 5,313,928 | 5/1994 | Rodgers et al. . |
| 5,341,793 | 8/1994 | Brown . |
| 5,345,923 | 9/1994 | Luebke et al. . |
| 5,603,256 | 2/1997 | Charlson et al. ..................... 99/400 X |

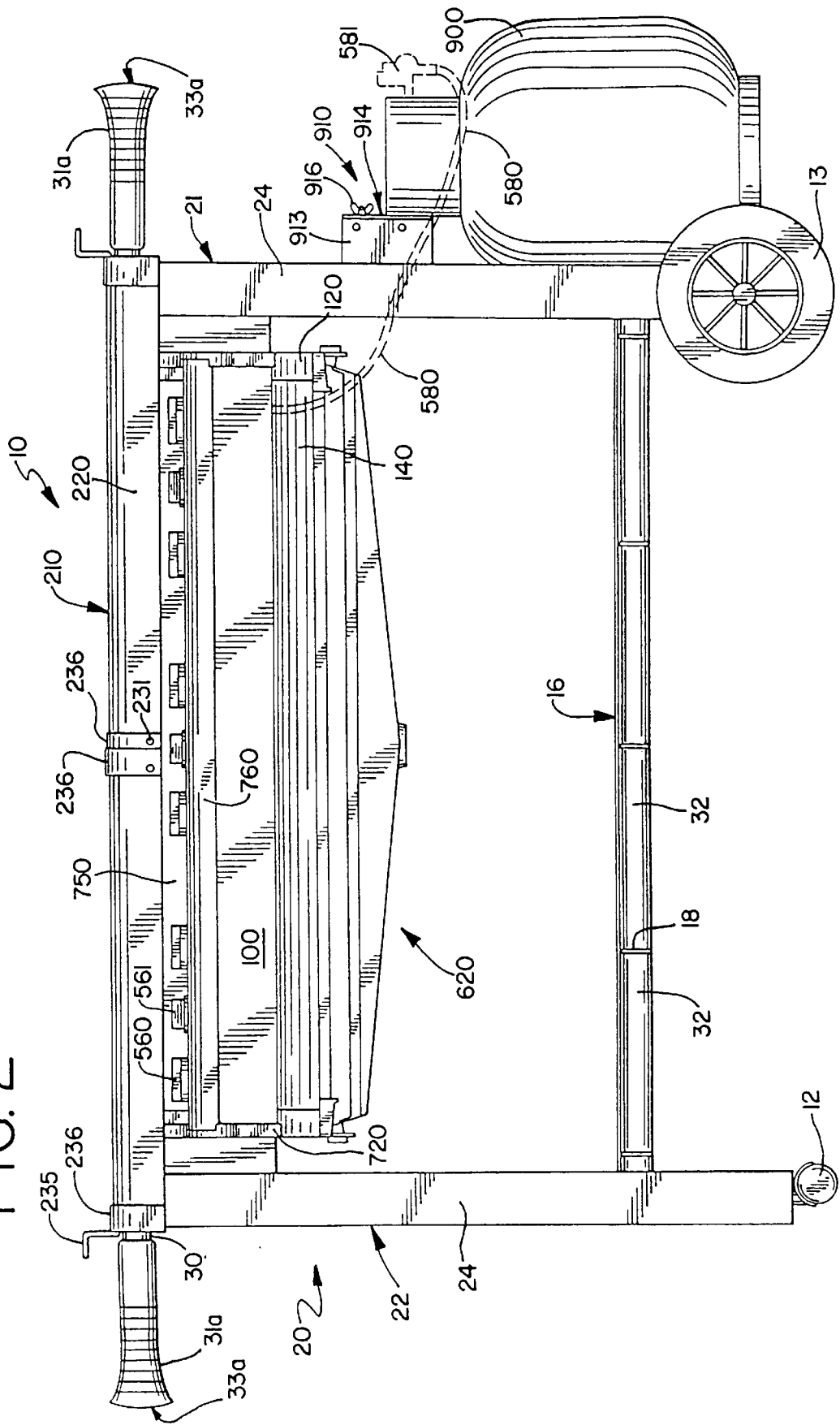

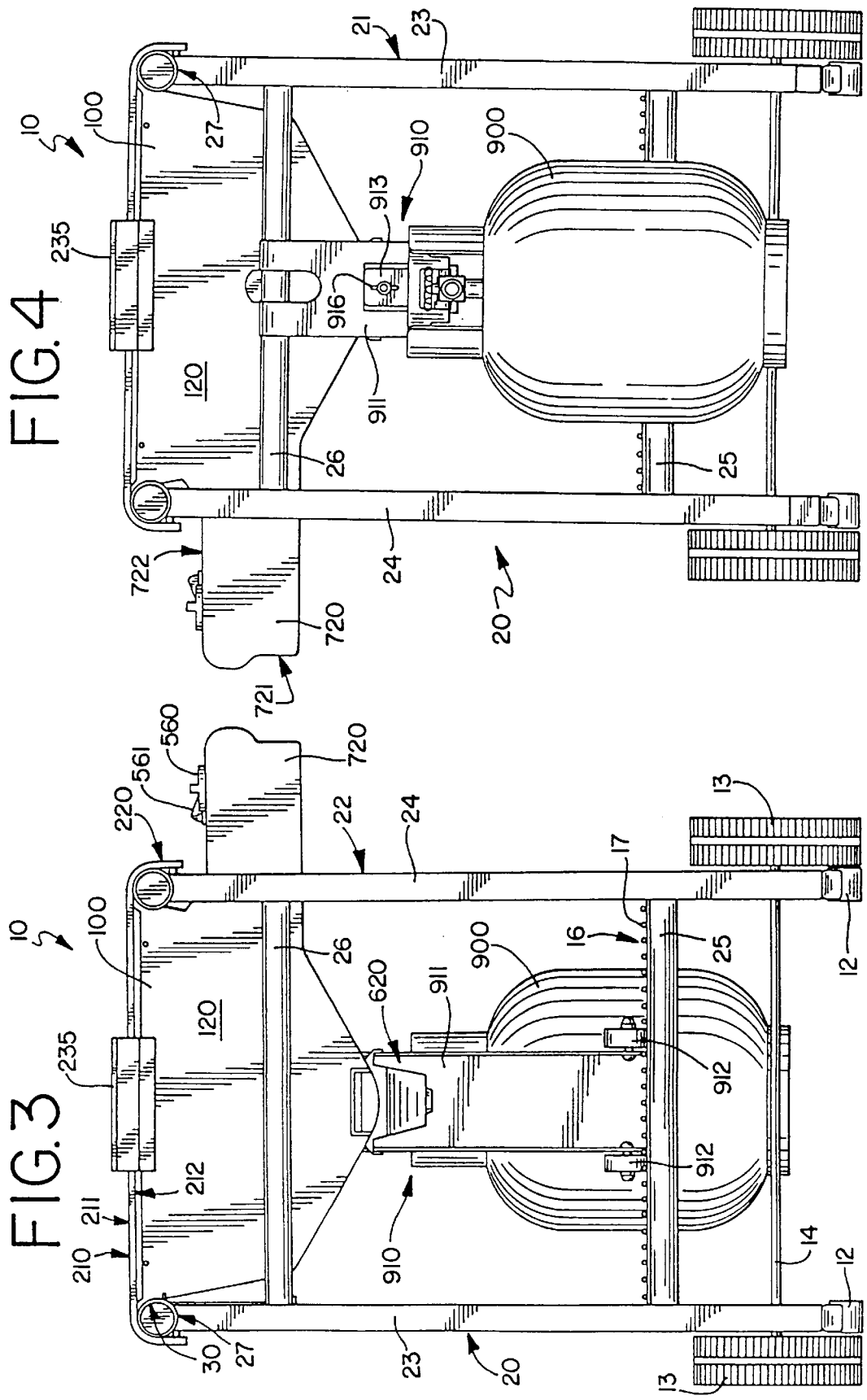

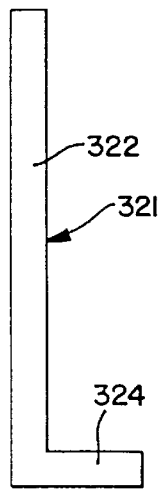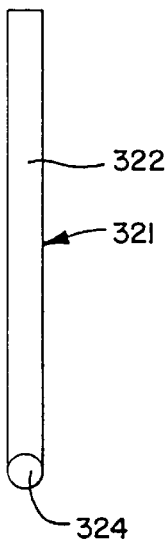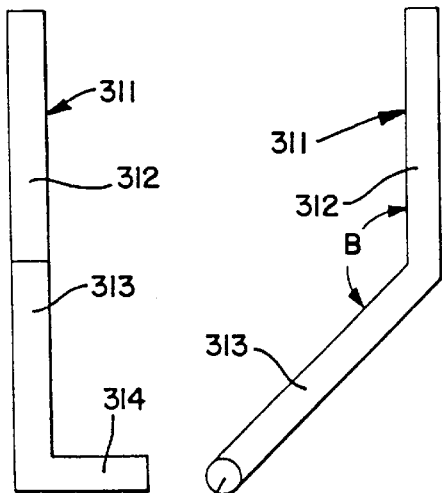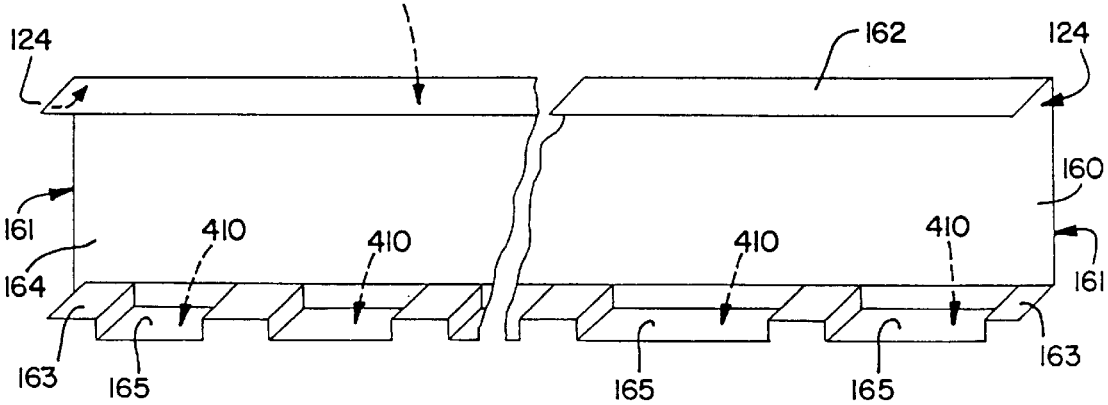

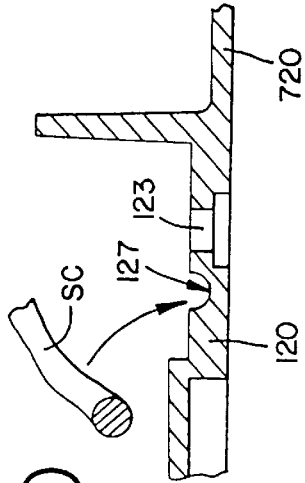
FIG. 20
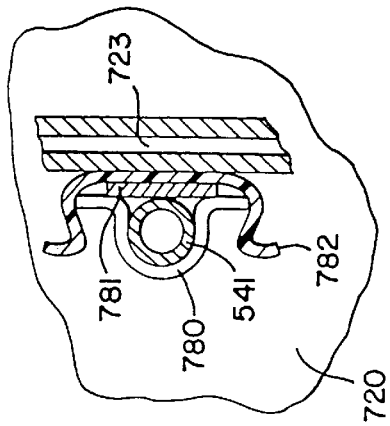
FIG. 22
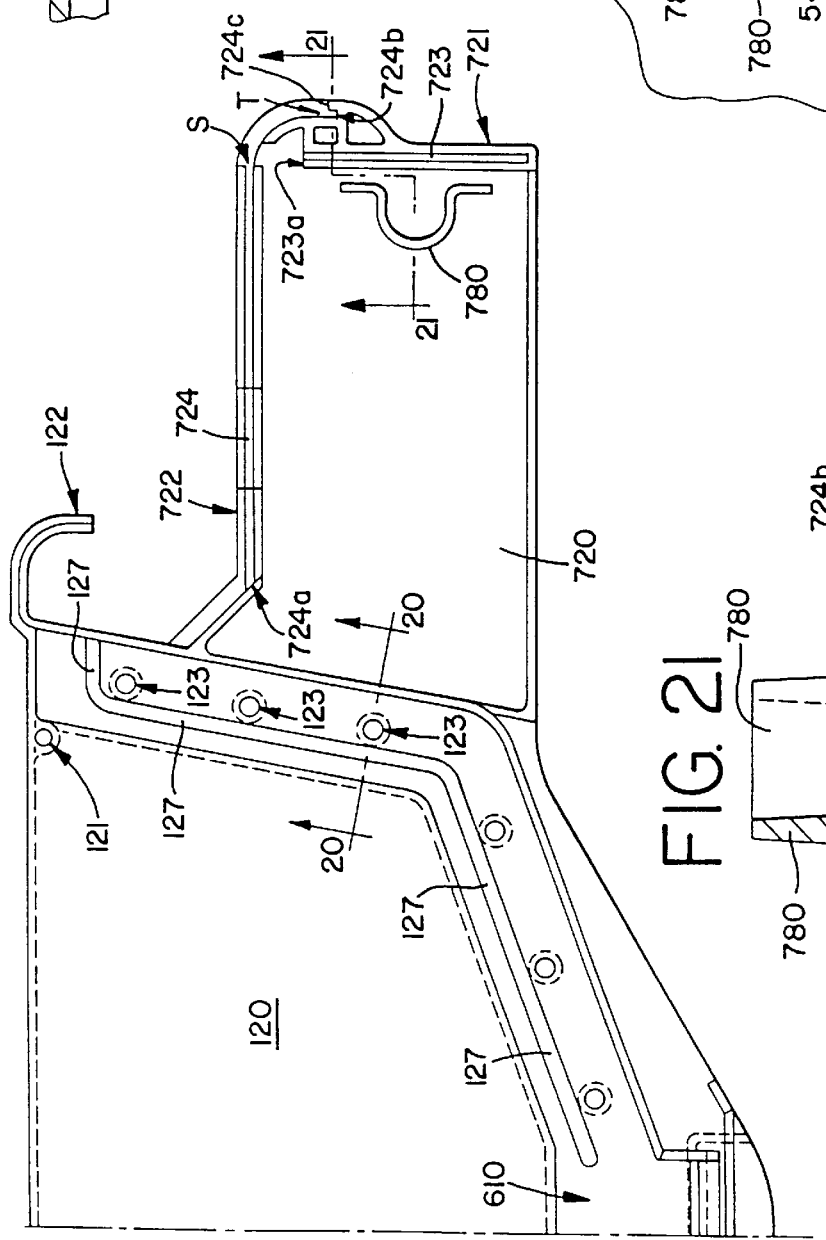
FIG. 19
FIG. 21

PORTABLE GAS GRILL

CROSS-REFERENCE TO RELATED APPLICATION

This application is a continuation of application Ser. No. 08/437,137, filed on May 5, 1995, now U.S. Pat. No. 5,765,469 which is hereby incorporated herein by reference.

TECHNICAL FIELD

The present invention relates generally to portable cooking devices, and more particularly, to portable gas grills for cooking food items.

BACKGROUND PRIOR ART

Today, portable gas grills are very popular for outdoor cooking. They are convenient, clean and safe. They generally consist of a cart, a firebox or cooking chamber with a cover, one or more gas burners, lava rocks or sear bars, and a cooking grid. Numerous models exist in all types of styles, sizes and shapes. Some are pre-assembled and others must be assembled by the consumer or owner. The assembling of a portable grill can range from relatively easy and tool-free to extremely difficult and labor and tool intensive.

Two very popular product lines on the market are the GENESIS® Series Gas Barbecues and the SPIRIT™ Series Gas Barbecues, both made by WEBER-STEPHEN PRODUCTS CO., Palatine, Ill. These products have met with great success in the market. Even though these high quality grills have introduced many innovative features, they have maintained their ease of assembly. Such innovative and patented features include, among others: numerous design breakthroughs (U.S. Pat. Nos. Des. 293,067 and Des. 316,355); burner tube assemblies (U.S. Pat. No. 4,677,964); scale mechanisms for indicating the amount of fuel in the tank (U.S. Pat. No. 4,677,964); inverted V-shaped sear bars that go over the burners (U.S. Pat. No. 4,727,853); multipurpose thermometers (U.S. Pat. Nos. 4,777,927 and 4,966,125); burner guards for preventing spiders from entering the burners (U.S. Pat. No. 4,829,978); side burner assemblies for use with portable grills (U.S. Pat. No. 4,860,724); ignitor housings for protecting the gas ignitors (U.S. Pat. No. 4,941,817); warming cradles supported on the grill cover (U.S. Pat. No. 5,070,776); steam and wood chip smokers (U.S. Pat. No. 5,167,183); and, rotisserie and skewer assemblies (U.S. Pat. No. 5,245,917). Additional patents and other innovations are also included in WEBER® grills.

In a continuous effort to improve upon current designs and products, add innovative features, and to ensure a grill's ease of assemblage, the present invention was developed.

SUMMARY OF THE INVENTION

The assembly of the present invention is structurally engineered such that it can be easily assembled by a purchaser without the use of any special tools and in a simplified manner. All that is needed to construct the grill assembly is a couple of wrenches and possibly a hammer. The flexibility of the present assembly is great. Work surfaces double as covers. In a multi-burner configuration, there are distinct and separate zones for grilling. In one zone, one can barbecue food on a wire or a porcelain enamel cooking grate; in another grilling zone, one can fry food by using a griddle; in a further zone, one can smoke food with a smoker. Consequently, food can be grilled, fried, smoked, warmed, rotisseried, boiled. A myriad of combinations and uses are thus available for the user. Or, one can grill in a single grilling zone and leave the other zone or zones off. In short, the combinations of cooking styles and uses available to the user are endless.

In particular, a portable gas barbecue grill is disclosed having a cart of generally rectangular configuration with a plurality of vertical posts supporting a firebox above the ground. The firebox has opposed cast metal side members and porcelainized metal (metal having a porcelain enameled surface or coating thereon) opposed end members, that being a front end member and a rear end member, with an opening at the top thereof, a substantially horizontal cooking grid, cooking surface or cooking vessel is supported below the opening therein. At least one burner is also supported in the firebox. In addition, both the side members and the end members are inwardly tapered to a lower slot created or formed between the end members for permitting grease to pass therethrough.

According to a first aspect of the present invention, the cover for the firebox comprises a pair of separate, relatively flat porcelainized metal covers. Each cover has an inner and an outer transverse edge and is longitudinally slidable between an open position and a closed position. The opening at the top of the firebox and the cooking grid are exposed and the inner transverse edges of the covers are generally above the side members of the firebox when the covers are in the open position. In the closed position, the opening at the top of the firebox is covered and the inner transverse edges of the covers are generally above the firebox at a median position between the side members of the firebox. The covers can be used as work surfaces adjacent the cooking surface when they are in the open position or when either is in the closed position and the burners below it are not on.

According to another aspect of the present invention, at least one elongated rectangular cooking guard having opposed side edges and opposed end edges is pivotally connected to the firebox for movement between a guarding position and a non-use position. In the guarding position, the cooking guard projects upwardly from the plane of the front end member of the firebox and a leading end edge of the cooking guard is disposed above the cooking surface.

According to still another aspect of the present invention, a porcelainized metal removable grease collector is positioned below the lower slot. This lower slot is created between the end members in the construction of the firebox. Specifically, the side members include a plurality of receptacles and the end members have side flanges with apertures therein aligned with the receptacles for permitting a fastener, such as a bolt, to pass through each aperture in the side flanges of the end members into a receptacle in the side members.

In addition, another aspect of the present invention is that the vertical posts support at least two parallel, substantially horizontal, porcelainized metal upper longitudinal members and the side members of the firebox have opposed outwardly projecting hooks or hangers adapted for engaging the upper longitudinal members and for permitting the firebox to hang between and be supported by these upper longitudinal members.

Further, as to the covers, each includes opposed vertical end flanges with each end flange supporting a substantially horizontal glide. The covers thus slide on the upper longitudinal members and the glides contact a bottom surface of the upper longitudinal members. Moreover, each end flange has an inwardly projecting, substantially horizontal distal flange for permitting each glide to rest thereon. This adds extra strength in minimizing the possibility of the glides bending. The bottom surface of each upper longitudinal member supports two stops and one stop of each upper member is aligned with one stop of the other upper member resulting in two pairs of parallel stops. Each pair of aligned stops engages the distal flanges or the glides of one of the covers to stop further movement of that cover as it is slid from the closed position to the open position.

Moreover, the upper longitudinal members include extensions forming handles for gripping and maneuvering the cart. For this purpose, at least two vertical posts further support adjacent their lower ends wheels, the wheels being transversely spaced apart. In addition, each handle is flared or tapered at its outermost side for abutting and supporting the cover in a level or horizontal position when the cover is slid to the open position.

In addition, as to the cooking guard, there are, in the preferred embodiment, two elongated rectangular cooking guards, one being a front cooking guard and one being a rear cooking guard. Each guard has opposed side edges and opposed end edges and is pivotally connected to the firebox for movement between a guarding position and a non-use position. As noted, in the guarding position, each cooking guard projects upwardly beyond one end member of the firebox and a leading end edge of each cooking guard is disposed above the plane formed by the cooking surface. More particularly, when the cooking guards are in the guarding position, in a first embodiment of the guards, the cooking guard projects upwardly and outwardly beyond the plane formed by the end member of the firebox, the leading end edge of the cooking guard is disposed above and outwardly of the cooking grid, where the angle the plane of the cooking guard with respect to the cooking grid or cooking surface is obtuse, approximately 135 degrees. In a second embodiment of the cooking guards, the cooking guard projects upwardly beyond the plane formed by the end member of the firebox, where the angle the plane of the cooking guard with respect to the cooking grid is approximately 90 degrees. In both embodiments, when the cooking guards are in the un-used position, they are in the firebox covering portions of the cooking grid and are generally resting on or near the cooking grid.

In addition, each cooking guard includes a pair of downwardly projecting pivot pins, each pivot pin being attached adjacent a side edge of the cooking guard and each pivot pin further having a bent extension therein. Each bent extension cooperates with an aperture formed in a side member of the firebox adjacent the opening. The cooking guards are substantially planar and do not have holes therein. Moreover, the end edges of the cooking guards have parallel flange portions and the pivot pins are connected along the side edges of the cooking guard.

According to another aspect of the present invention, the side members have a coplaner extension piece of cast metal with a front and a top edge and an upper channel therein along the top edge and. A porcelainized metal top face plate having opposed sides is securely held at each side in this upper channel. This top face plate further has apertures therein for receiving controls for the burners of the grill. In addition, the extension piece further includes a porcelainized metal front channel therein along the front edge. A front face plate having opposed sides is securely held at each side in this front channel of the extension piece of a side member.

As to the burner supported inside the firebox, it comprising at least one pair of two elongated parallel burner units or tubes. Each unit has two ends, a plurality of spaced apertures therein, a flattened portion at one end and at the other end means for controlling the fuel into the unit and means for igniting the fuel. The flattened portion of the burner units is connected to a brace, which in turn, is connected to either the two side members or the two end members. Additionally, the pair of parallel burner units is connected by and in communication with a pilot tube adjacent the one end of each burner unit so that one of the pair of burner units may be ignited and the other of the pair of burner units is ignited from the pilot tube.

There is at least one sear bar seated above each burner unit in the firebox. The sear bars consist of an elongated inverted V-shaped member formed of heat conductive material to define inclined grease-evaporating surfaces that extend generally parallel to the burner unit.

For fireboxes of different sizes, there can be two, three or even more pairs of burner units creating distinct and separate grilling zones. Each pair of parallel burner units is connected by and in communication with a pilot tube adjacent the one end of each burner unit so that one of the pair of burner units may be ignited and the other of the pair of burner units is ignited from the pilot tube.

With respect to the firebox, each side member includes two spaced apart inwardly projecting protuberances, each protuberance being adjacent the opening and adjacent an end member. A pair of substantially U-shaped supports, each having two sides and an upper ledge and a lower ledge and a base portion disposed therebetween, are oriented with the upper and lower ledges substantially horizontal and facing into the firebox and with the base portion being substantially vertical, and are hung. In particular, each side of the upper ledge of the U-shaped support is positioned to rest on a protuberance attached to a side member. The cooking grid, cooking surface or cooking vessel are consequently seated on the upper ledges of the pair of U-shaped supports. And, the lower ledge of each U-shaped support further includes spaced apart seats adapted for seating the plurality of V-shaped sear bars in spaced relation to one another above the burners and below the cooking grid, cooking surface or cooking vessel.

As to the grease collector, each side member includes an inwardly projecting shelf adjacent a lower edge thereof and the grease collector includes an L-shaped bracket at each side thereof for sliding onto and off of the projecting shelves below the slot in the firebox. The grease collector further includes inwardly tapering walls leading to a lower opening therein, and further includes a removable grease collector tray supported below the lower opening.

Other features and advantages of the invention will be apparent from the following specification taken in conjunction with the following drawings.

BRIEF DESCRIPTION OF THE DRAWINGS

In order that the present invention may be more fully understood, it will now be described by way of example, with reference to the accompanying drawings in which:

FIG. 2 is a front elevation view of the portable gas grill;

FIG. 3 is a left side elevation view of the portable gas grill;

FIG. 4 is a right side elevation view of the portable gas grill;

FIG. 14 is an end elevation view of a first pivot pin for the rear cooking guard;

FIG. 15 is a side elevation view of the first pivot pin for the rear cooking guard;

FIG. 16 is an end elevation view of a second pivot pin for the front cooking guard;

FIG. 17 is a side elevation view of the pivot pin for the front cooking guard;

FIG. 18 is a perspective front view of a U-shaped support;

FIG. 19 is a partial side elevation view of a side member;

FIG. 20 is a sectional view of the side member along line 20—20 in FIG. 19;

FIG. 21 is a sectional view of the side member along line 21—21 in FIG. 19; and, FIG. 22 is a detail of the manifold connection.

DETAILED DESCRIPTION

Figure 1:
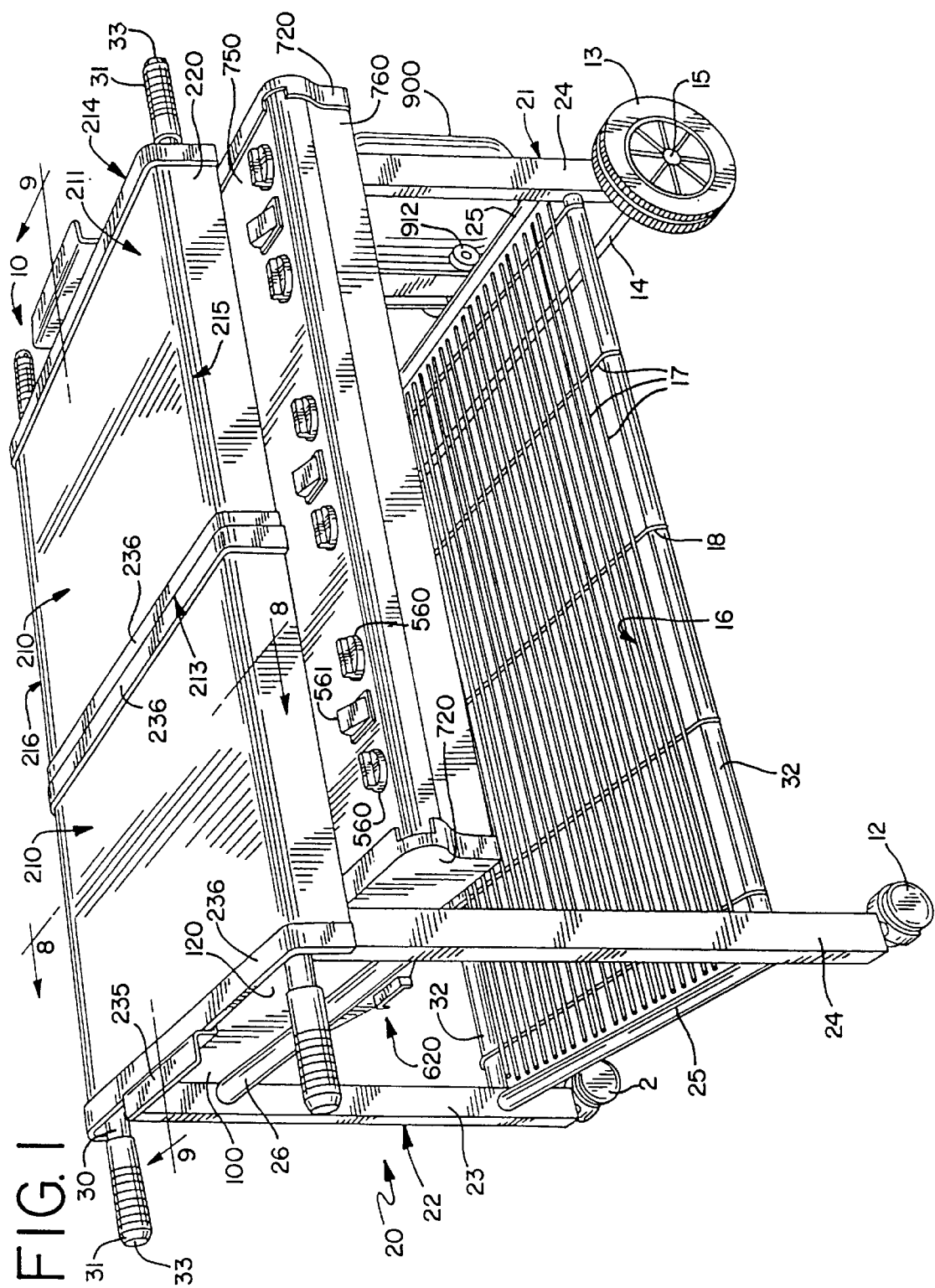
FIG. 1 is a top perspective view of the portable gas grill made in accordance with the teachings of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The Cart Assembly

A portable gas grill is shown in FIG. 1, generally designated by reference number 10. The gas grill 10 is supported by a cart 20 of generally rectangular configuration. The cart 20 includes two side frame members 21,22, that being a right side frame member 21 (FIG. 4) and a left side frame member 22 (FIG. 3). Each side frame member 21,22 includes two parallel, spaced apart substantially vertical posts 23,24 and two connecting, parallel, spaced apart substantially horizontal transverse posts 25,26. The components of each side frame member 21–26 are tubular, being circular or rectangular in cross-section and hollow, and are welded together. The vertical posts 23,24 have the ends of two horizontal posts 25,26, welded to them. The horizontal posts 25,26 can also be attached by conventional fasteners to the vertical posts 23,24.

All four of the vertical posts 23,24 have upper inwardly directed rounded seats 27 (FIGS. 3 and 10) cut in their upper end. This arcuate seat cooperates and holds a substantially horizontal upper longitudinal member 30. In particular, the two front vertical posts 24 together support a front upper longitudinal member 30 and the two rear vertical posts 23 together support a second, rear upper longitudinal member 30. The upper longitudinal members are parallel to one another and also tubular, circular in cross section. The upper longitudinal members 30 are either welded to the vertical posts 23,24 or fastened by conventional means, i.e., nut and bolt, to the vertical posts.

Similarly, the four vertical posts further have welded to them two lower longitudinal members 32 that are parallel to the upper longitudinal members 30. The lower longitudinal members 32 are attached at points adjacent to (and at the same level as) the horizontal transverse posts 25. These lower longitudinal members 32 are preferably welded to the vertical posts 23,24, but may also be fastened by conventional means, i.e., nut and bolt, to the vertical posts.

The vertical posts 23,24 of the left side frame member 22 have casters 12 attached to the bottoms thereof, again by conventional fasteners or by inserts with attached casters that fit into the bottoms of the tubular posts. The vertical posts 23,24 of the right side frame member 21 have wheels 13 adjacent thereof that project below the bottoms of the vertical posts. Each of vertical posts 23,24 of the right side frame member 21 has a hole therein passing therethrough (not shown) adjacent its bottom for receiving a transverse axle 14. The axle 14 passes through each vertical posts 23,24 and extends an amount beyond each post for receiving a wheel 13 in the front and in the rear. The wheels 13 have central holes (not shown) for receiving the axle 14. A simple fastener, such as a pin or an axially mounted, radial gripping hubcap 15 attaches to each end of the axle 14 projecting out from the wheel 13 to secure the wheel to the axle and the vertical post 23,24. In the alternative, the full axle or projecting axle stubs can be either welded or assembled to the posts and the wheels snapped and held on to the axle or stubs.

A rack 16 or grid comprised of a plurality of welded, interconnected rods 17 is supported on the parallel lower horizontal transverse posts 25 and adjacent lower horizontal longitudinal members 32. In the alternative, this rack 16 can be comprised of a plurality of wooden slats, a plurality of recycled plastic slats, or a grid made from recycled plastics. This grid or rack 16 is useful as a storage rack for loose items such as, among other things, a charcoal bag, a griddle, one or more cooking grids, cooking pans and utensils. As shown in FIGS. 1 and 2, the ends of transverse rods 17 of the rack 16 have down-turned portions 18 for contacting and holding the rack onto the lower longitudinal members 32.

A firebox 100 is supported above the ground on the cart 20. The firebox 100 includes opposed longitudinal end members 140 and opposed transverse side members 120 with an opening at the top thereof. A substantially horizontal cooking grid 101 (FIGS. 8 and 9) is supported in the firebox 100.

The Sliding Covers

Figure 5:
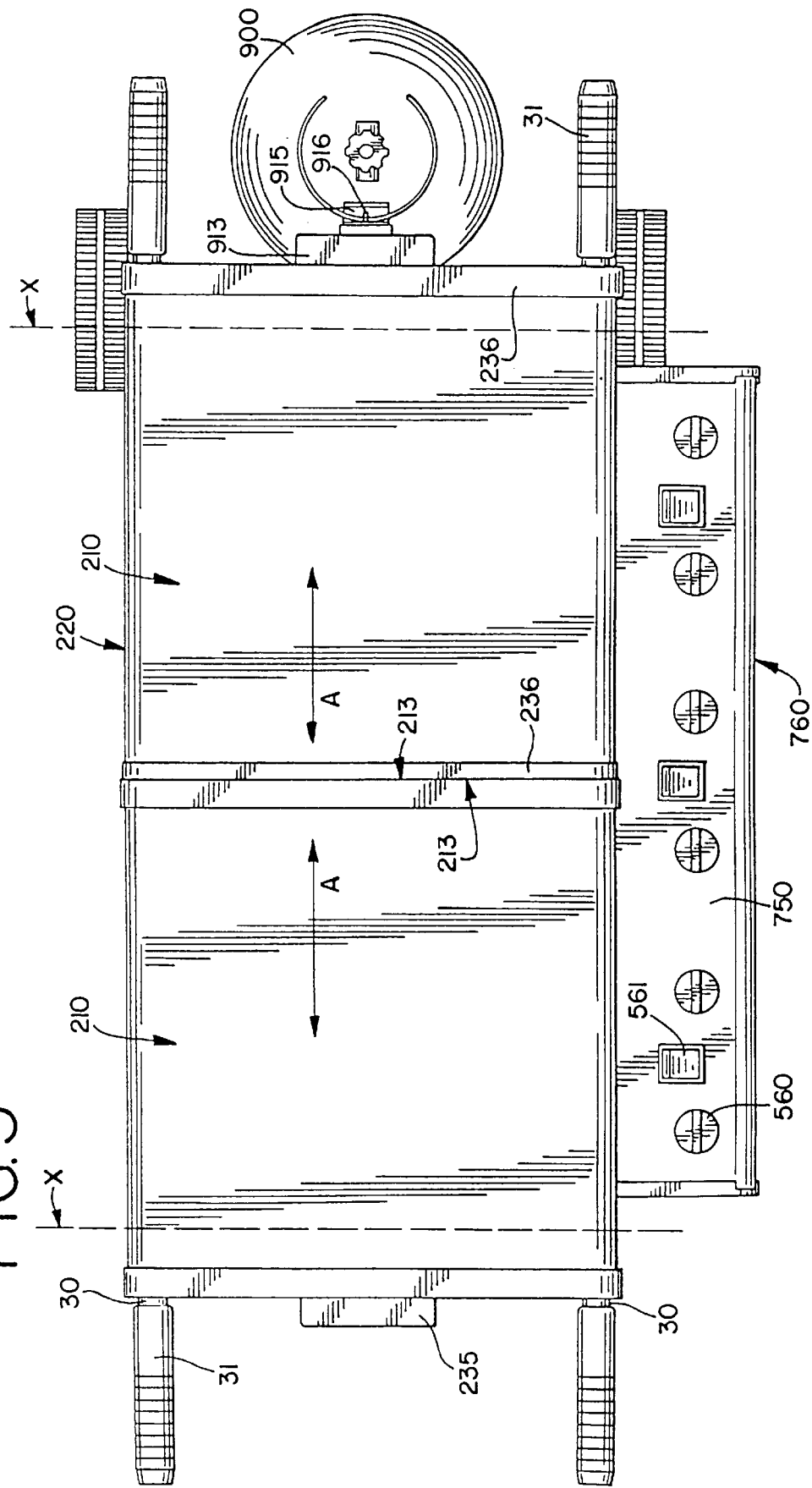
FIG. 5 is a top plan view of the portable gas grill.

A pair of sliding substantially flat covers 210 cover the top of the firebox 100. Each cover 210 has an external surface 211 and an internal surface 212, an inner 213 and an outer 214 transverse edge, and a front 215 and rear 216 longitudinal edge. The two covers 210 are longitudinally slidable between an open position and a closed position. The figures show the covers in the closed position. This is represented in FIG. 5 where the Arrows A show the course or direction of the covers 210. The covers, shown in the closed position, may be opened so that their inner transverse edges 213 align with the dashed line represented by the reference letter X. In the open position, the top of the firebox 100 and the cooking grid 101 are exposed and the inner transverse edges 213 of the covers 210 are generally above the side members 120 of the firebox 100; in the closed position, the opening at the top of the firebox 100 is covered and the inner transverse edges 213 of the covers 210 are generally above the transverse center of the firebox 100, namely at a median position between the side members 120 of the firebox.

Figure 8:
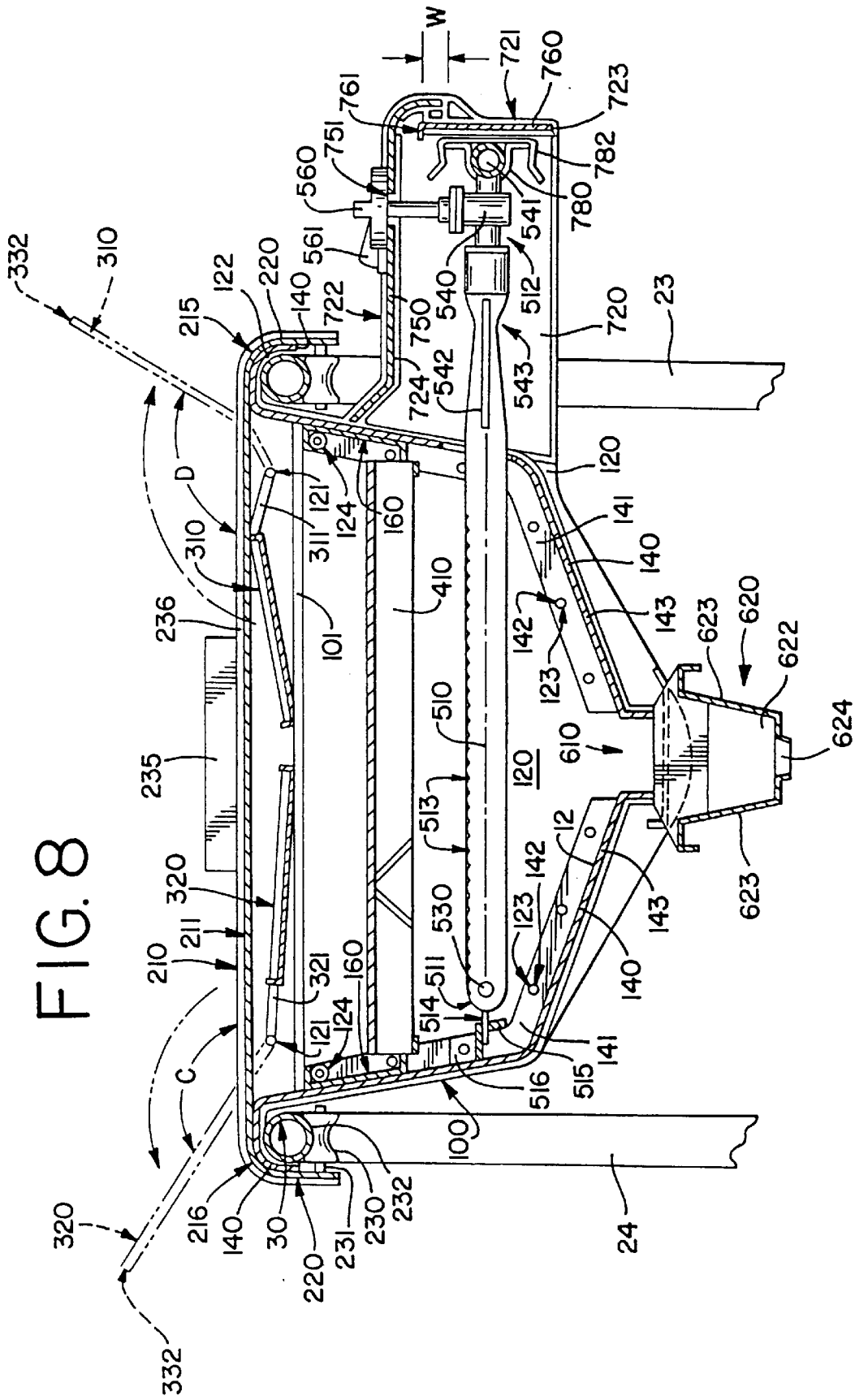
FIG. 8 is a partial sectional view along line 8—8 in FIG. 1.
Figure 10:
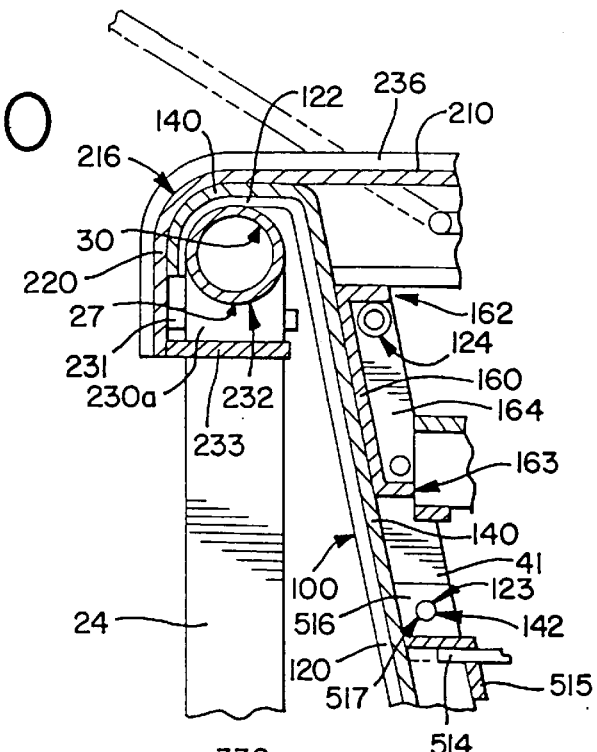
FIG. 10 is a detail sectional view of the cover sliding mechanism.
Figure 11:
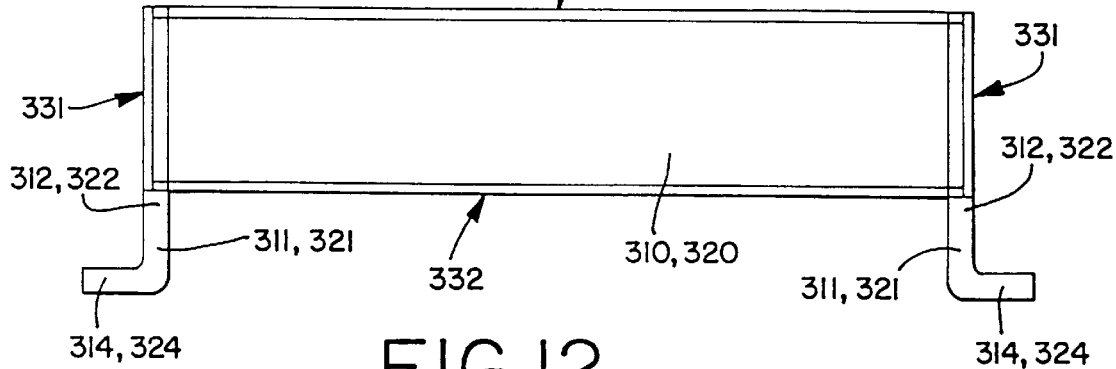
FIG. 11 is an end elevation view of a cooking guard.
Figure 12:
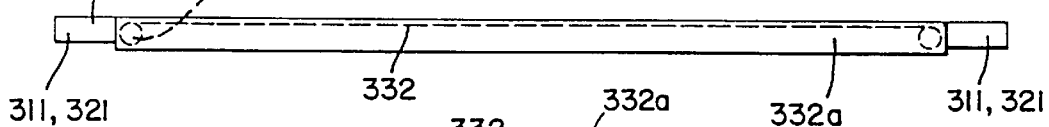
FIG. 12 is a top plan view of a cooking guard.

Turning to FIGS. 8 and 10, each cover 210 includes opposed vertical end flanges 220 projecting downwardly from the front and rear longitudinal edges 215,216 of each cover. Each end flange 220 supports along its length a substantially horizontal glide 230. This glide 230 is fastened by a fastener 231 to the end flange 220. The glide 230 is a smooth, hard rigid plastic in the form of a freely rotating roller 230 (FIG. 8) or a block 230a (FIG. 10), both with an inwardly directed arcuate top glide surface 232. Consequently, the covers 210 slide on the upper longitudinal members 30 and the glides 230 contact a bottom surface of the upper longitudinal members. In addition, in an alternative embodiment, wherein a block 230a is attached to the end flange 220 (FIG. 10), the end flange has an inwardly projecting, substantially horizontal distal flange 233 with each glide resting on a distal flange.

The bottom surface or an end surface of each upper longitudinal member supports a stop or bumper (not shown) that engages either the distal flange, end flange, or the glide of one end of the cover to stop further movement of the cover. In the alternative, the vertical posts 23,24 will act as a stop or a bumper for the glides 230 or blocks 230a. Thus, as the covers are slid from the closed position to the open position they will be prevented from sliding beyond the upper longitudinal members 30 and separating from the cart 20.

The upper longitudinal members 30 further include side extensions for permitting insulated plastic or rubber handles 31 to slip thereover for gripping and maneuvering the cart 20. While the ends 33 of the handles 31 are shown to be tapered inwardly, towards the center of the longitudinal member 30 (FIG. 1), the ends 33 may also be tapered outwardly. This alternate handle construction is shown in FIG. 2 and identified with reference numbers 31a and 33a. It has been found that the handles 31a of the second embodiment with the flared end 33a support the covers 221 when the covers are opened. Consequently, when the covers 210 are spread open, they will not droop as a result of their weight; instead, they 210 will stay level and horizontal. This added support is also helpful when the covers are used as a work surface and downward pressure or force is placed on them.

In addition, insulated cover handles 235 may be secured to the outer sides of the covers to assist in sliding the covers open or closed. As mentioned, the covers are also substantially planar and flat. They are also porcelainized metal, with insulated side guards 236 covering and protecting the inner and the outer transverse edges 213,214. The side guards 236 are constructed so that one fits under the other; one guard 236 tucks under the other guard 236. The guards 236 nestle or overlap. This prevents water (rain) and other liquids from falling into any crack between the guards that would be present if they merely abutted one another.

As just noted, one or both of the covers can be used as a work surface. Because the covers are separate, one or both can be opened or closed. A cover can be used as a work surface, e.g., preparing food, either when it is in the open position or when it is in the closed position and the burners (discussed later) underneath it are off. Thus, if a user wants to use only the burners on the left side of the grill, only the left side cover needs to be slid open. The right cover can remain closed and used as a work surface.

The Cooking Guards

The gas grill further includes one or more elongated rectangular cooking guards 310 (front guard),320 (rear guard). (FIGS. 8 and 11–17). The guards 310,320 are positioned for preventing grease from spattering onto an individual or item positioned in front of or behind the firebox 100. The guards may also be used to support tools or utensils while idle between cooking activities. Each guard 310,320 is substantially planar, devoid of holes therein, and has opposed side edges 331 and opposed end edges 332. Each guard 310,320 is pivotally further connected to the firebox 100 and adapted for movement between a guarding position (shown in dashed lines in FIG. 8) and a non-use position (shown in solid lines in FIG. 8).

In practice, both guards 310,320 are configured and work like the rear cooking guard 320. A second embodiment of the guards is shown and described in the exemplification of the front cooking guard 310.

In the guarding position, the front guard 310 projects upwardly and outwardly beyond the front end member 140 of the firebox 100. The front guard 310 rests on the upper edge of the firebox 100 and the leading end edge 332 of the front cooking guard 310 is disposed above and frontwardly of the cooking grid 101. As a result, the plane of the cooking guard makes an obtuse angle (Angle D in FIG. 8) with the cooking grid 101. Similarly, in the guarding position, the rear guard 320 projects upwardly and outwardly beyond the rear end member 140 of the firebox 100. The rear guard 320 rests on the upper edge of the firebox 100 and the leading end edge 332 of the rear cooking guard 320 is disposed above and rearwardly of the cooking grid 101. As a result, the plane of this cooking guard 320 makes an obtuse angle (Angle C in FIG. 8) with the cooking grid 101. When the cooking guards are in the un-used position, the guards 310,320 are in the firebox 100, covering a portion of the cooking grid 101 and resting on the cooking grid.

The cooking guards 310,320 each includes a pair of downwardly projecting pivot pins 311,321. Each pivot pin 311,321 is attached adjacent a side edge 331 of the cooking guard 310,320 and each pivot pin further has a section 312,322 parallel to the side edge 331 and a bent extension 313,314,324 therein. Each bent extension 314,324 cooperates with and fits into an aperture 121 formed in a side member 120 of the firebox 100 adjacent the firebox opening.

Figure 13:
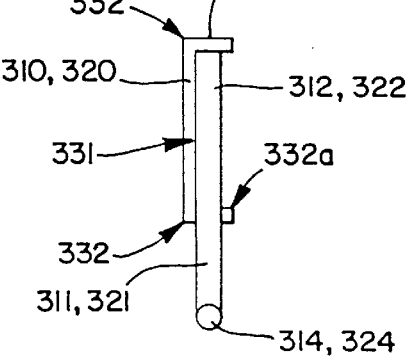
FIG. 13 is a side elevation view of a cooking guard.

As shown in FIG. 13, the end edges 332 of the cooking guards 310,320 further have parallel flange portions 332a and the pivot pins 311,321 are connected, via welding or notches formed in the pins and apertures formed in the flange portions 332a, along the side edges 331 of the cooking guards. The side edges can also have flanges therein.

In the first embodiment (FIGS. 12, 13, 14 and 15), in the guarding position (FIG. 8), the rear guard 320, projects upwardly beyond the rear end member 140 of the firebox 100 and the angle the plane of the rear cooking guard makes with the cooking grid is approximately just greater than 135 degrees (Angle C in FIG. 8). This is accomplished by merely having the bent extension 324 normal to the parallel section 322 and the positioning of the aperture 121 formed in the side member 120. In the second embodiment (FIGS. 12, 13, 16 and 17), in the guarding position (FIG. 8), the front guard 310, projects upwardly beyond the front end member 140 of the firebox 100 and the angle the plane of the front cooking guard makes with the cooking grid is approximately just greater than 90 degrees (Angle D in FIG. 8). This is accomplished by forming an additional bent section 313 in the parallel section 312 in the pivot pin 311 of approximately 135 degrees (Angle B in FIG. 17) and again the positioning of the aperture 121 formed in the side member 120. The bent extension 314 is also normal to the parallel section 312 and additional bent section 313.

The Firebox Side Members and End Members

Noted previously, the firebox 100 is supported by the upper longitudinal members 30 and has opposed longitudinal end members 140 and opposed transverse side members 120. An opening is at the top thereof, a horizontal cooking grid 101 is therein and a plurality of burners 510 are therein. The two side members 120 are cast aluminum metal and the two end members 140 are porcelainized sheet metal. The end members are attached to the side members, which will be discussed in detail later.

The firebox 100 and the burner assembly are constructed at the factory along with the side frame members 21,22. The consumer merely completes the assembly of the cart 20 and hangs the firebox 100 on the cart. Specifically, the side members 120 have opposed outwardly projecting hooks or hangers 122 adapted for engaging the upper longitudinal members 30 and for permitting the firebox 100 to hang between the upper longitudinal members. Thus, the firebox 100 is hung on the upper longitudinal members 30 in the opening between the longitudinal upper members and the upper horizontal transverse posts 26.

As to the construction of the firebox 100, the side members 120 include a plurality of receptacles 123 along the edge thereof and the end members 140 have side flanges 141 with a plurality of apertures 142 therein. The apertures 142 in the side flanges 141 of the end members 140 align with the receptacles 123 in the side members 120 for permitting a fastener (not shown) to pass through each aperture into a receptacle. Appropriate fasteners include rivets and/or bolts. When the end members 140 are attached to the side members 120, a lower slot 610 is created between the end members for permitting grease to pass therethrough.

An internal trough 127, shown in FIGS. 19 and 20, is formed in the side members 120 generally spaced from and parallel to the perimeter or edge of the side member. A silicone cord (shown schematically in FIG. 20 and identified with SC) is placed into this trough 127. The cord is substantially round in cross-section and acts as a string washer and gasket between the fastened together end members and side members.

In addition, as shown in the sectional views of FIGS. 8 and 10, the upper ends of the end members 140 may be bent to cover and protect the upper longitudinal members 30. This can similarly be accomplished by using a separate piece of metal.

The Support for the Grid and the Sear Bars

Each cast side member 120 includes two horizontally spaced apart inwardly projecting protuberances 124. These protuberances 124 are in the form of relatively short, inwardly directed cylinders. In the alternative, they 124 can be L-shaped brackets bolted to the side member 120. Each protuberance 124 is generally adjacent (below) the top of the side member 120 and the opening in the firebox 100. Each 124 is also collinear with the receptacles 123 and adjacent an end member 140. Or, in the case where the protuberances 124 are L-shaped brackets, the brackets are fastened (bolted) in the receptacles 123 (FIG. 19). The protuberances 124 support two opposed U-shaped supports 160. (FIGS. 8–10 and 18). The U-shaped supports 160 hold the substantially horizontal cooking grid 101 and the sear bars 410 spaced below and substantially parallel to the cooking grid. Each U-shaped support has opposed sides 161 and an upper ledge 162 and a lower ledge 163 with a base portion 164 disposed therebetween. The U-shaped support 160 is oriented in the firebox 100 with the upper and lower ledges 162,163 being substantially horizontal and the base portion 164 being substantially vertical. This base portion sits adjacent the end members. Each side 161 of the upper ledge 162 of the U-shaped support 160 rests on a protuberance 124 attached to one of the side members 120 as shown in FIGS. 8, 10 and 18. Consequently, opposed protuberances 124, one attached to each side member 120 support the opposed sides 161, specifically the opposed upper ledges 162, of each U-shaped support 160. And, the protuberances 124 attached to the left side member 120 support the left sides 161 of the two facing U-shaped supports 160; the protuberances 124 attached to the right side member 120 support the right sides 161 of the two facing U-shaped supports 160. The cooking grid 101 is thus seated on the upper ledges 162 of the opposed U-shaped supports 160 facing one another. The parallel V-shaped sear bars or FLAVORIZER® bars 410 between the burners 510 and the cooking grid 101 are seated on the lower ledges 163 of the two facing U-shaped supports 160. The lower ledge 163 of each U-shaped support 160 further includes spaced apart seats 165 adapted for seating the V-shaped sear bars 410 in spaced relation to one another.

The incorporation of the U-shaped supports 160 into the system makes assembly and disassembly of the various components in the firebox 100 very easy. As a result, cleaning the firebox and the numerous components associated with it is uncomplicated and simple. One merely removes the cooking grid, the sear bars, and the U-shaped supports and one has basically complete and easy access to the interior of the firebox and the burner assembly. To reach normally difficult places inside the firebox, complicated manipulating and maneuvering is unnecessary. The removed components can also be easily cleaned and simply reassembled.

The Burners

The grill 10 further includes a gas burner 510 in the firebox below the sear bars 410 in the form of one or more pairs of elongated parallel burner units 510. In the embodiment shown, FIG. 9, three pairs of burner units, or burner tubes, 510 are shown. Smaller units have two pairs of burner tubes 510 and larger units have eight pairs of burner tubes 510. The burner tubes 510 are connected to a fuel tank 900 by a regulator 581 and fuel line 580, shown as double dashed lines in FIG. 2.

Each burner tube 510 has two ends 511,512, a plurality of spaced apertures 513 therein, a flattened portion 514 at one end and at the other end means for controlling the fuel into the unit 510 and means for igniting the gas. The flattened portions 514 of all the burner tubes 510 are connected to a longitudinal brace 515 that is connected at each side to a side members 120. In particular, the longitudinal brace 515 has at each side thereof a flange 516 (FIG. 10) with a hole 517 therein for receiving a fastener connecting the flange to the side member 120. The hole 517 is aligned with an aperture 142 in the side flange 141 of the end member 140 and with a receptacle 123 in the side member 120. The fastener (not shown) thus passes through the hole 517 and aperture 142 into the receptacle 123. Again, appropriate fasteners include rivets and/or bolts.

Each pair of parallel burner tubes 510 is connected by and in communication with a pilot tube 530 adjacent the flattened end 511 of the coupled burner tubes so that one of the pair of burner tubes may be ignited and the other of the pair of burner tubes is ignited from the pilot tube 530. The details of the pilot tube are described in U.S. Pat. No. 4,677,964, owned by WEBER-STEPHEN PRODUCTS CO. and incorporated herein by reference.

The end 512 of at least one of the burner tubes 510 of each pair of burner tubes is connected to a control valve 540, a gas manifold 541, and an ignitor (not shown) for controlling the flow of gas into the tubes 510 and for igniting the pair of burner tubes. Adjacent the control valve is an inlet for air 542 and a venturi 543 for mixing the air and gas entering the tube 510. In the embodiment shown, there is one control valve 540 controlled by a rotatable knob 550 for each tube 510 and one ignitor for each coupled pair of tubes controlled by a push button 561.

The manifold 541 carrying gas to the burner tubes is connected to the fuel line 580 (FIG. 2), a regulator 581 and fuel tank 900.

While not shown, the burner tubes and ignitors are also assembled with ignitor housings for protecting the gas ignitors (U.S. Pat. No. 4,941,817) and burner guards for preventing spiders from entering the burners (U.S. Pat. No. 4,829,978).

Figure 9:
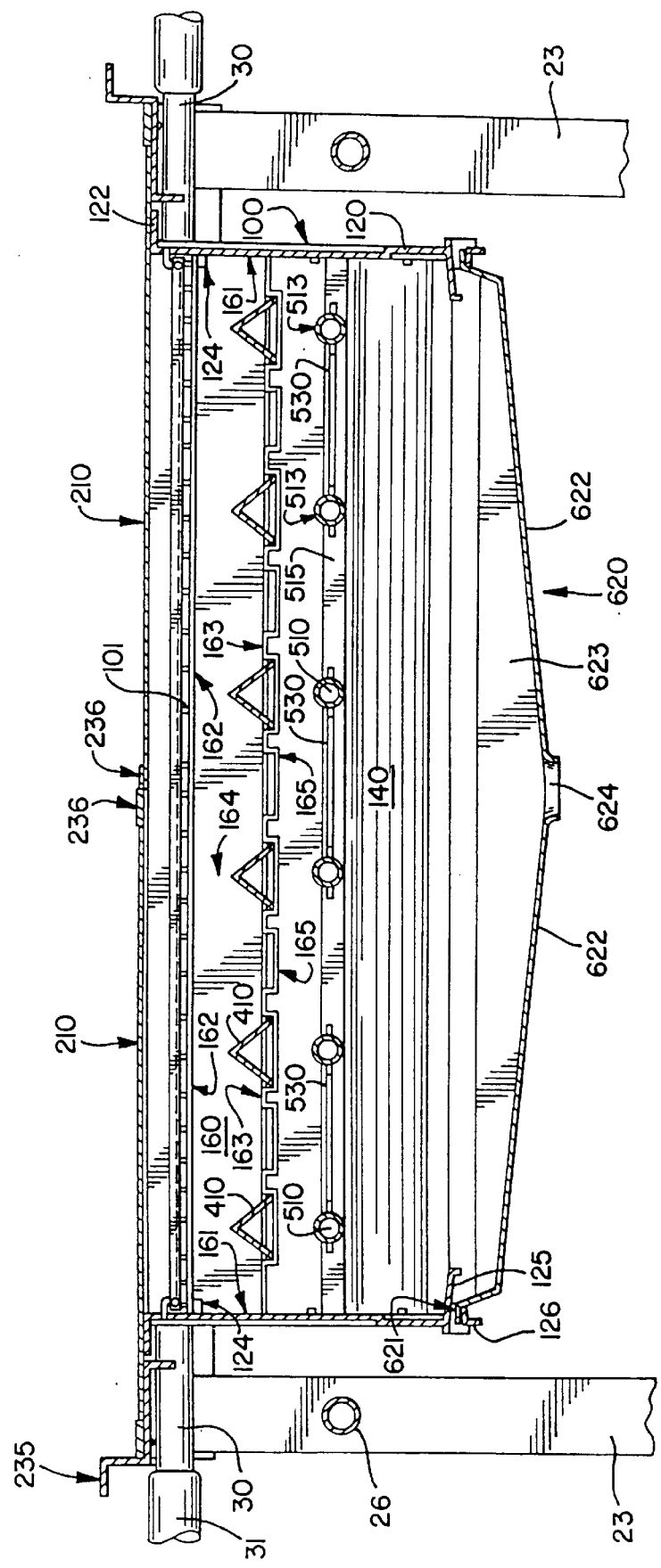
FIG. 9 is a partial sectional view along line 9—9 in FIG. 1.

Referring again to FIG. 9, at least one V-shaped sear bar or FLAVORIZER® bar 410 is seated directly above each burner tube 510. Grease can thus flow down the elongated inverted V-shaped sear bar 410 resulting in smoke for flavorizing any food on the cooking grid 101. In addition, the sear bars 410 minimize the possibility of undesirable flare-ups caused by dripping grease and protect the burner tubes from the falling grease and any build up thereon. The details of the sear bars are discussed in U.S. Pat. Nos. 4,677,964 and 4,727,853, both owned by WEBER-STEPHEN PRODUCTS CO. and incorporated herein by reference. Each sear bar 410 is created of a heat conductive material, such as cold-rolled steel or stainless steel, which may also have a porcelain enamel coating thereon (porcelainized metal) resulting in inclined grease-evaporating surfaces extending generally parallel to the burner unit 510. The inclined surfaces of the sear bars are smooth resulting in the drippings flowing down the inclined surfaces. While only sear bars positioned above the burner tubes are shown in FIG. 9, sear bars are also positioned between the burner tubes. The lower ledge 163 of the opposed U-shaped support 160 has spaced apart seats 165, again as shown in FIGS. 9 and 18, adapted for seating the V-shaped sear bars 410 in spaced relation to one another both directly above each burner tube and between the burner tubes.

The Front Extensions of the Side Members

The cast side walls or members 120 of the grill 10 of the present invention also includes two coplaner extension pieces 720, one extension piece per side member. FIGS. 19–21 show the details of these extension pieces. These opposed side extension pieces 720 each have a front edge 721 and top edge 722 and an upper channel or groove 724 therein along the top edge and a front channel or groove 723 therein along the front edge. A top face plate 750 having opposed sides slides into the two opposed upper channels 724 and is slid, locked and held at each side in one of the upper channels 724 of the extension piece 720 of a side member 120. Similarly, a front face plate 760 having opposed sides slides into and is locked into the two front channels 723 and is held at each side in one of the front channels 723 of the extension piece 720 of a side member 120.

In particular, with respect to the top face plate 750 and referring to FIG. 19, the end of each side of the face plate is fed into the top groove 724, as shown by Arrow S. The side is fed until it hits the end wall 724a. The unfed portion and unfed end of the face plate 750 naturally deflects up. This unfed end is then placed in the pocket 724b formed adjacent the front edge 721 of the extension 720 (Arrow T). The detent or lip 724c of this pocket 724b prevents the top face plate 750 from springing out of the channel or groove 724,724a,724b. Or, if formed with a curve, the top face plate 750 sits in the groove 724,724a,724b in a relaxed state. With both sides threaded, the top face plate 750 is locked between the two opposed extensions 720.

As to the front face plate 760, one end is bent creating a lip 761 (FIG. 8). Each end of the face plate 760 can thus be fed into the front groove 723. The lip 761 will then rest on the upper edge 723a (FIG. 19) of a wall of the groove 723.

Both the front face plate and top face plate protect the burner assemblies from rain. The two face plates further keep rain from running down the front panel into the grease collector 620 and grease tray. Moreover, there is a slight overlap (marked W in FIG. 8) between the front face plate 760 and the top face plate 750 to prevent dirt and rain from entering the area between the face plates.

As seen in FIG. 8, the top face plate 750 has apertures 751 therein for receiving controls 560 for the burners 510 of the grill 10 and for controls 561 for igniting the burners. In the embodiment shown, there are six (6) control knobs 560 for the burner tubes 510 and three (3) ignitor buttons 561 for the three pairs of burner tubes. In addition, the preferred embodiment, the top face plate and the front face plate are porcelainized metal.

With reference to FIGS. 8, 19,20 and 22, the side member extensions 720 also support the manifold 541 connecting the fuel line 580 to the burner tubes 510. The manifold runs between the extensions 720 from side to side. An omega-shaped wall 780 is cast into each extension 720. A small rectangular plank 781 is also welded to each side of the manifold 541. Each side of the manifold 541 is placed into the omega-shaped wall 780 with the plank 781 facing outwardly as shown in FIG. 22. A contoured spring clip 782 is then forced between the plank 781 and a wall of the front channel 723. When released, the clip 782 holds the manifold 541 in each of the contoured arcuate walls 780 shaped like an omega.

The Grease Collector

FIG. 8 shows a sectional view of the end members 140, which are inwardly tapered 143 forming a ramp leading to a lower gap or slot 610 created between the end members. These inwardly directed ramps 143 permit grease to flow downwardly thereon towards the slot. A removable grease collector 620 is positioned below this lower slot 610 for collecting the grease run-off. Both the side members 120 have an inwardly projecting deflectors 125 (FIG. 9) also for directing grease to the lower slot 610. Also shown in FIG. 9, each side member 120 further includes an inwardly projecting shelf 126 spaced below the deflector 125 for supporting an upper, outwardly projecting lip 611 at a side of the grease collector 620. Opposed inwardly projecting shelves 126 formed into the side members 120 support the two, opposed outward lips 621 of the grease collector 620. As a result, the upper lips 621 can be slid off and on to the inwardly projecting shelves 126 and hence, the removable grease collector 620 can be slid off and on the bottom of the firebox 100. This permits easy cleaning of the grease collector.

The grease collector 620 further includes inwardly tapering walls 622,623 leading to a lower opening 624 therein.

Below this opening 624, a smaller, removable grease collector tray or collector (not shown) is supported by means of a conventional bracket or holder. Such a support means can be a wire assembly, as the one shown and described in U.S. Pat. No. 4,677,964, owned by WEBER-STEPHEN PRODUCTS CO., which is incorporated herein by reference. Finally, the removable grease collector 620 is preferably made of porcelainized metal.

The Shields

Figure 6:
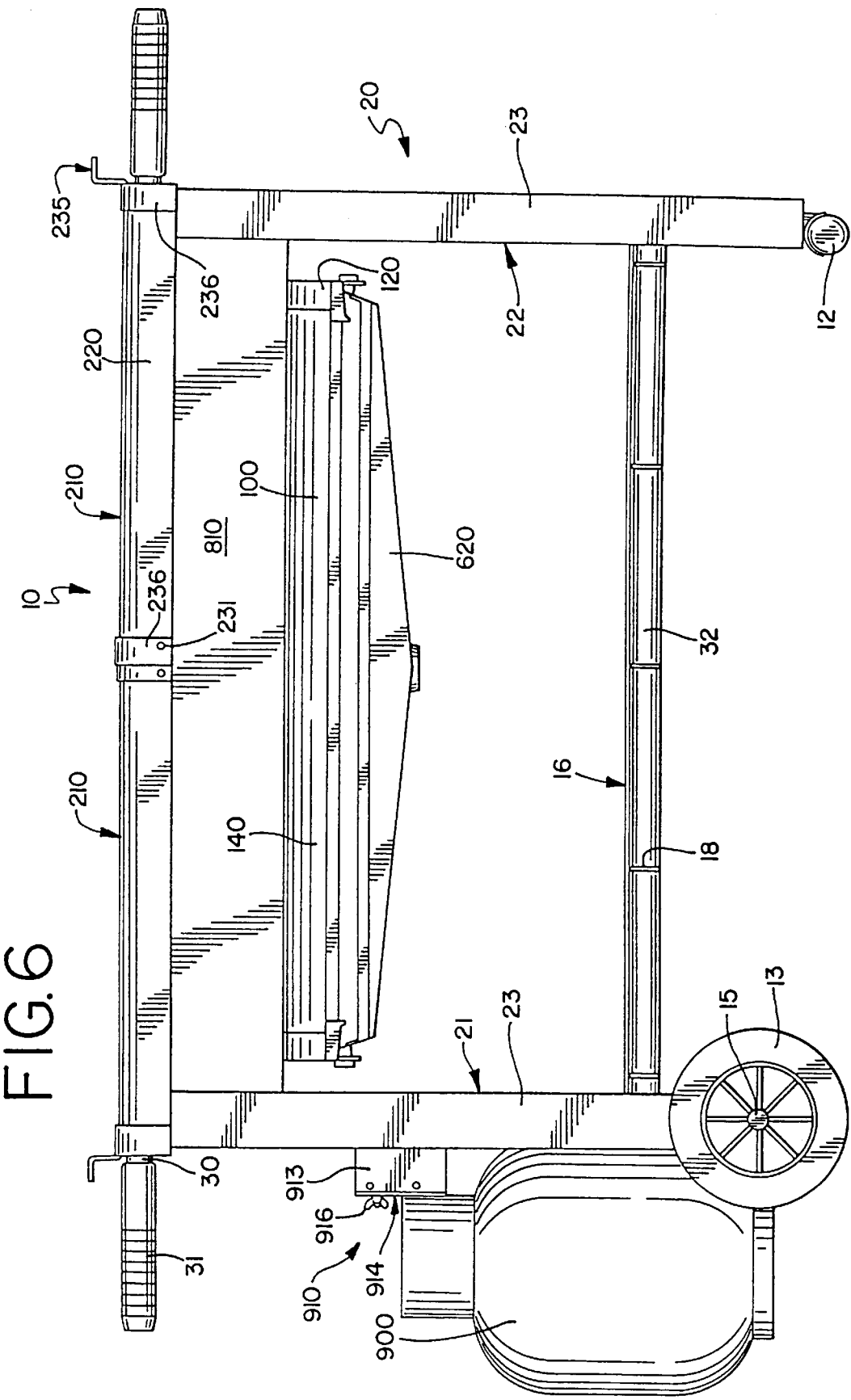
FIG. 6 is a rear elevation view of the portable gas grill.
Figure 7:
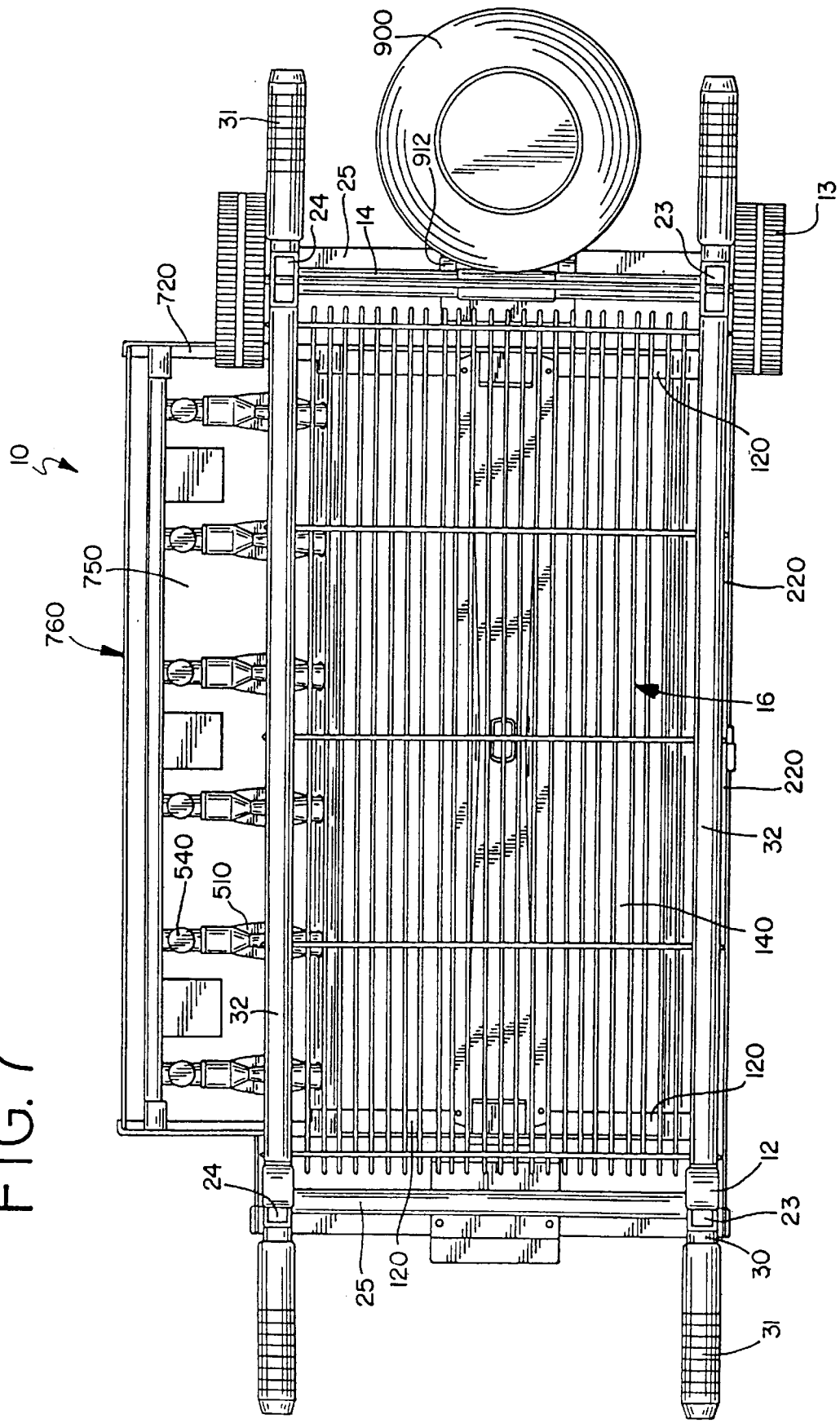
FIG. 7 is a bottom plan view of the portable gas grill.

With reference to FIG. 6, a heat shield 810 is secured to the rear vertical posts 23 by fasteners connected to the sides of the shield for both protecting individuals and items from direct contact with the upper portion of the firebox 100 and protecting the firebox from rain and debris. A similar heat shield may also be attached to the front vertical posts 24.

The Fuel Tank and the Tank Scale

The gas grill also incorporates a tank-support means 910 for a fuel tank 900. The tank-support means 910 is located on one side of the cart 20, that being the right side frame member 21, between the vertical posts 23,24 on the right side of the cart. The tank 900 is supported directly above the wheels 13. The tank-support means 910 includes a vertical brace 911 that is configured at its top for wrapping around a portion of and hanging from the upper horizontal transverse post 26. The brace 911 is thus free to rotate or pivot about the horizontal transverse post 26. Alternatively, the brace 911 can be welded or bolted to the transverse post 26. This brace 911 is U-shaped in cross section (FIG. 1). Two small, freely-rotatable wheels 912 are attached adjacent the bottom of the brace 911 for contacting the tank. These wheels 912 dampen any friction the fuel tank 900 cause by its being put on to the assembly, taken off the assembly or while supported on the assembly. Specifically, the tank 900 will also move as its fuel is consumed relative to the brace 911. The wheels 912 assist this necessary relative movement. A tank scale box 913 is attached to the outer surface of the vertical brace 911. And, a tank bracket 915 is attached by a fastener 916 to a cover element 914 interconnected to the tank scale box 913. The tank bracket supports the tank 900 by engaging an aperture formed in the top of the tank for carrying the tank. As the tank's fuel is consumed, the weight of the tank 900 is reduced, resulting in movement of the tank bracket 915 and cover element 914 relative to the tank scale box 913 and in movement of the tank 900 relative to the brace 911. Consequently, the amount of fuel in the tank 900 can be gauged. The details of the tank scale box 913 and the mechanics of the scaling is discussed in detail in U.S. Pat. No. 4,677,964, owned by WEBER-STEPHEN PRODUCTS CO., which is incorporated herein by reference.

Conclusion

The entire assembly is structurally engineered such that it can be easily assembled by a purchaser without the use of any special tools and in a simplified manner. All that is needed to construct the grill assembly is an allen wrench and an open ended adjustable wrench. If the wheels need to be forced onto the axle or stubs, a hammer may also be of assistance.

In addition, the flexibility of the assembly is great. The work surfaces, which double as covers, are immediately adjacent the cooking surfaces. In addition, multiple uses of the system are possible. For example, in a six burner system having three pairs of burners, there are three zones of grilling. In the first grilling zone, that being one pair of burners, one can barbecue food on a wire or a porcelain enamel cooking grate; in the second grilling zone using another pair of burners, one can fry food by placing a griddle over the burner pair; in a third zone, still another pair of burners, one can smoke food with a smoker (U.S. Pat. No. 5,167,183, WEBER®'s STEAM-N-CHIPS™ smoker) in the assembly. With other apparatuses and devices food can be warmed, rotisseried, boiled, etc. Or, one can grill on one pair of burners and leave the other two pairs of burners off. In short, the combinations of cooking styles and uses available to the user are endless.

While the specific embodiments have been illustrated and described, numerous modifications come to mind without significantly departing from the spirit of the invention and the scope of protection is only limited by the scope of the accompanying claims.

We claim:

1. A grill comprising:
a cart of generally rectangular configuration having a plurality of vertical posts and supporting a fire box, the firebox having opposed longitudinal end members formed of sheet metal and integrally connected to two opposed transverse side members formed of cast metal, the firebox having an opening at the top thereof and means for supporting a substantially horizontal cooking surface therein and means for supporting at least one burner therein.

2. The grill of claim 1 wherein the means for supporting the cooking surface includes a plurality of inwardly-spaced protuberances on the side members.

3. The grill of claim 1 wherein the end members are made of porcelainized metal and the side members are made of cast aluminum metal.

4. The grill of claim 1 wherein the burner comprising at least one pair of elongated parallel burner units, each burner unit having two ends, a plurality of spaced apertures therein, a flattened portion at one end and at the other end means for controlling the fuel into the units and means for igniting the fuel.

5. The grill of claim 1 wherein the at least one burner unit is connected to a brace, the brace being connected to either a side member or an end member.

6. The grill of claim 4 wherein each pair of parallel burner units is connected by and in communication with a pilot tube adjacent the one end of each burner unit so that one of the pair of burner units may be ignited and the other of the pair of burner units is ignited from the pilot tube.

7. The grill of claim 4 further including at least one sear bar seated above each burner unit in the firebox, each sear bar consisting of an elongated inverted V-shaped member formed of heat conductive material to define inclined grease-evaporating surfaces extending generally parallel to the burner unit.

8. The grill of claim 1 wherein the end members have side flanges with a plurality of apertures and the side members have a plurality of receptacles in alignment with said apertures, said alignment of the receptacles and the apertures being adapted to receive fasteners for securing the end members to the side members.

9. The grill of claim 1 further including at least one sear bar seated above said at least one burner unit and below said cooking grate in the firebox, said at least one sear bar consisting of an elongated inverted V-shaped member formed of heat conductive material to define inclined grease-evaporating surfaces extending generally parallel to the burner unit.

10. The grill of claim 8 wherein a gasket is positioned between the integral connection of the side members to said end members.

11. The grill of claim 1 further including at least one sear bar seated above said at least one burner unit in the firebox, said at least one sear bar consisting of an elongated inverted V-shaped member formed of heat conductive material to define inclined grease-evaporating surfaces positioned between said at least one burner and said cooking surface.

12. A grill comprising:
   a cart of generally rectangular configuration having a plurality of vertical posts supporting a firebox having opposed longitudinal end members of sheet metal, parallel and vertical transverse side members of cast metal connected to the end members with an opening at the top thereof and means for supporting a substantially horizontal cooking surface therein and means for supporting at least one burner therein, the side members and the end members being inwardly tapered to lead to a lower slot created between the end members for permitting grease to pass therethrough; and,
   a removable grease collector positioned below the lower slot.

13. The grill of claim 12 wherein the end members are made of porcelainized metal.

14. The grill of claim 12 wherein each side member further includes an inwardly projecting shelf adjacent a lower edge thereof and the grease collector includes an L-shaped bracket at each side thereof for sliding onto and off of the projecting shelves.

15. The grill of claim 14 wherein the grease collector further includes inwardly tapering walls leading to a lower opening therein and further includes a removable grease collector tray supported below the lower opening.

16. The grill of claim 15 wherein the removable grease collector is porcelainized metal.

17. The grill of claim 15 wherein the removable grease collector is sheet metal.

18. The grill according to claim 12, wherein, the side members are comprised of cast aluminum.

19. The grill according to claim 12, further comprising;
   a gasket positioned between the connection of said end members and said side members.

20. The grill according to claim 19, wherein each side member includes an internal trough generally spaced from and parallel to a perimeter edge, said gasket being positioned at least partially within the trough of the side members.

* * * * *